(12) United States Patent
Delerse et al.

(10) Patent No.: US 10,990,525 B2
(45) Date of Patent: Apr. 27, 2021

(54) CACHING DATA IN ARTIFICIAL NEURAL NETWORK COMPUTATIONS

(71) Applicant: Mipsology SAS, Palaiseau (FR)

(72) Inventors: Sebastien Delerse, Brétigny sur orge (FR); Benoit Chappet de Vangel, Paris (FR); Thomas Cagnac, Longpont sur Orge (FR)

(73) Assignee: Mipsology SAS

( * ) Notice: Subject to any disclaimer, the term of this patent is extended or adjusted under 35 U.S.C. 154(b) by 64 days.

(21) Appl. No.: 16/217,070

(22) Filed: Dec. 12, 2018

(65) Prior Publication Data
US 2020/0192797 A1    Jun. 18, 2020

(51) Int. Cl.
*G06N 3/063* (2006.01)
*G06F 12/0802* (2016.01)
(Continued)

(52) U.S. Cl.
CPC ......... *G06F 12/0802* (2013.01); *G06N 3/063* (2013.01); *G06N 3/08* (2013.01); *G06N 5/046* (2013.01); *G06F 2212/608* (2013.01)

(58) Field of Classification Search
CPC .......... G06F 12/0802; G06F 2212/608; G06N 3/063; G06N 3/08; G06N 5/046
See application file for complete search history.

(56) References Cited

U.S. PATENT DOCUMENTS

| 5,253,330 A | * | 10/1993 | Ramacher | ................ G06N 3/04 |
| | | | | 706/42 |
| 5,956,703 A | * | 9/1999 | Turner | ................... G06N 3/063 |
| | | | | 706/27 |

(Continued)

FOREIGN PATENT DOCUMENTS

WO   WO-2018194995 A1 * 10/2018 .......... H03M 7/6058

OTHER PUBLICATIONS

Romano, Sam; "A Neural Network Cache Replacement Implementaion in the Squid Cache;" Apr. 24, 2008; Stetson University; Available at: https://www2.stetson.edu/~helaarag/samromano_proposal.pdf or https://web.archive.org/web/20080424174943/https://www2.stetson.edu/~helaarag/samromano_proposal.pdf (Date verificaiton).*

(Continued)

*Primary Examiner* — Jason W Blust
*Assistant Examiner* — Richard L Sutton
(74) *Attorney, Agent, or Firm* — Georgiy L. Khayet (57) ABSTRACT

Systems and methods for caching data in artificial neural network computations are disclosed. An example method may comprise receiving, by a communication unit, data and a logical address of the data, the data being associated with the ANN, determining, by a processing unit coupled to the communication unit and to a plurality of physical memories and based on the logical address and physical parameters of the physical memories, a physical address of a physical memory of the plurality of physical memories, and performing, by the processing unit, an operation associated with the data and the physical address. The determination of the physical address can be based on a usage count of the data in the ANN computation or a time lapse between a time the data is written to the physical memory and a time the data is used in the ANN computation.

20 Claims, 9 Drawing Sheets

(51) Int. Cl.
*G06N 3/08* (2006.01)
*G06N 5/04* (2006.01)

(56) References Cited

U.S. PATENT DOCUMENTS

| | | | | |
|---|---|---|---|---|
| 7,606,934 | B1* | 10/2009 | Vengerov | G06F 3/0611 706/21 |
| 2005/0262323 | A1* | 11/2005 | Woo | G06F 13/161 711/167 |
| 2006/0090031 | A1* | 4/2006 | Kirshenbaum | G06F 12/0866 711/113 |
| 2008/0270338 | A1* | 10/2008 | Adams | G06K 9/00986 706/48 |
| 2008/0319933 | A1* | 12/2008 | Moussa | G06N 3/084 706/31 |
| 2013/0238855 | A1 | 9/2013 | Satran et al. | |
| 2016/0342890 | A1* | 11/2016 | Young | G06N 5/04 |
| 2017/0090754 | A1* | 3/2017 | Horn | G06F 3/061 |
| 2019/0164043 | A1* | 5/2019 | Litvak | G06N 3/063 |
| 2019/0266476 | A1* | 8/2019 | Schorn | G06N 3/063 |
| 2019/0303750 | A1* | 10/2019 | Kumar | G06N 3/063 |
| 2019/0311245 | A1* | 10/2019 | Zhang | G06N 3/063 |
| 2019/0385041 | A1* | 12/2019 | Gebhardt | G06N 3/0454 |

OTHER PUBLICATIONS

ElAarag, Hala: et el.; "A framework for using neural networks for web proxy cache replacement;" Jan. 2006; Stetson University; Available at: https://www.researchgate.net/publication/228382189_A_Framework_for_using_neural_networks_for_web_proxy_cache_replacement.*

Garcia, Ricardo: et el.; "A cache replacement policy based on neural networks applied to web map tile caching;" Jan. 2011; University of Valladolid; Available at: https://www.researchgate.net/publication/258725283_A_Cache_Replacement_Policy_Based_on_Neural_Networks_Applied_to_Web_Map_Tile_Caching.*

Romano, Sam: "A Neural Network Cache Replacement Implementation in the Squid Cache;" Apr. 24, 2008; Stetson University; Available at: https://www2.stetson.edu/~helaarag/samromano_proposal.pdf.*

Liu, Ling, etal; "Memory Hierarchy;" 2009; SpringerLink; Available at: https://link.springer.com/referenceworkentry/10.1007%2F978-0-387-39940-9_657.*

Zwass, Vladimir; "Neural Network;" Feb. 10, 2016; Britannica.com; available at: https://www.britannica.com/technology/neural-network (Year: 2016).*

Joshi, Naveen; "3 Types of Neural Networks That AI Uses;" Apr. 4, 2019; Allerin.com; available at: https://www.allerin.com/blog/3-types-of-neural-networks-that-ai-uses (Year: 2019).*

Mas, J.F. et al.; "The Application of Artificial Neural Network to the Analysis of Remotely Sensed Data;" Dec. 21, 2007;Taylor & Francis Group; available at: https://www.tandfonline.com/doi/pdf/10.1080/01431160701352154?needAccess=true (Year: 2007).*

Park, Sang-Soo et. al.; "CENNA: Cost-Effective Neural Network Accelerator;" MDPI; Jan. 10, 2020; available at: https://www.mdpi.com/2079-9292/9/1/134/htm (Year: 2020).*

* cited by examiner

CACHING DATA IN ARTIFICIAL NEURAL NETWORK COMPUTATIONS

TECHNICAL FIELD

The present disclosure relates generally to data processing and, more particularly, to system and method for caching data in artificial neural network (ANN) computations.

BACKGROUND

Artificial Neural Networks (ANNs) are simplified and reduced models reproducing behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of a multiplication by a constant. The ANNs are particularly useful for solving problems that cannot be easily solved by classical computer programs.

While forms of the ANNs may vary, they all have the same basic elements similar to the human brain. A typical ANN can be organized into layers, each of the layers may include many neurons sharing similar functionality. The inputs of a layer may come from a previous layer, multiple previous layers, any other layers or even the layer itself. Major architectures of ANNs include Convolutional Neural Network (CNN), Recurrent Neural Network (RNN) and Long Term Short Memory (LTSM) network, but other architectures of ANN can be developed for specific applications. While some operations have a natural sequence, for example a layer depending on previous layers, most of the operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes, which results in latency and lack of reactivity. To deliver the maximum throughput, very large GPUs can be used which may involve excessive power consumption, a typical issue of GPUs. Since the GPUs may require more power consumption for the computations of ANNs, the deployment of GPUs can be difficult.

To summarize, CPUs provide a very generic engine that can execute very few sequences of instructions with a minimum effort in terms of programming, but lack the power of computing required for ANNs. GPUs are slightly more parallel and require a larger effort of programming than CPUs, which can be hidden behind libraries with some performance costs, but are not very well suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. Programming of FPGAs, however, is challenging, requiring a much larger effort than programming CPUs and GPUs. Thus, adaption of FPGAs to perform ANN computations can be more challenging than for CPUs and GPUs.

Most attempts in programming FPGAs to compute ANNs have been focusing on a specific ANN or a subset of ANNs, or required to modify the ANN structure to fit into a specific limited accelerator, or provided a basic functionality without solving the problem of computing ANN on FPGAs globally. The computation scale is typically not taken into account by existing FPGA solutions, many of the research being limited to a single or few computation engines, which could be replicated. Furthermore, the existing FPGA solutions do not solve the problem of massive data movement required at a large scale for the actual ANN involved in real industrial applications.

The inputs computed with an ANN are typically provided by an artificial intelligence (AI) framework. Those programs are used by the AI community to develop new ANN or global solutions based on ANN. However, FPGAs typically lack integration with AI frameworks.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for caching data in ANN computations.

According to one example embodiment, a system for caching data in artificial neural network (ANN) computations is provides. The system may include a communication unit configured to receive data and a logical address of the data. The data can be associated with the ANN. The system may include a plurality of physical memories. The physical memories can be associated with physical addresses and physical parameters. The system may further include a processing unit coupled to the communication unit and to the plurality of physical memories. The processing unit can be configured to determine, based on the logical address and the physical parameters, a physical address of a physical memory of the plurality of physical memories. The processing unit may perform operations associated with the data and the physical address.

The plurality of physical memories may include at least two physical memories associated with different physical parameters. The different physical parameters may include different access speeds, different sizes, or different latencies for the operation. The operation includes a write to the physical memory at the physical address.

The logical address of the data is indicative of an input of one or more layers of the ANN or a weight of the one or more layers of the ANN.

The determination of the physical address of the physical memory can be based on a usage count of the data in the ANN computation.

The physical memories can be associated with priorities. The priorities can be based on physical parameters associated with the physical memories. The processing unit can select, based on an order of the priorities, the physical memory from the plurality of physical memories to perform an operation. A priority of the physical memory of the plurality of physical memories can be determined based on a time lapse between a time the data is written to the physical memory and a time the data is used in the ANN computation.

The data associated with the ANN may include a sequence of inputs. The processing unit can determine that a size of the data exceeds a size of the selected physical memory. In response to the determination, the processing unit may select a further physical memory from the plurality of memories. The further physical memory can be associated with a further priority. The further priority can be lower than a priority of the selected physical memory. The processing unit may write the inputs from the sequence to the selected physical memory and to the further physical memory.

The processing unit may receive a configuration for determining the physical address. The configuration may include information related to mapping of the data associated with one or more layers of the ANN to the priorities.

The processing unit may reside at a field-programmable gate array or at an application-specific integrated circuit. The plurality of physical memories may include a memory integrated with the processing unit. The plurality of physical memories may include a memory storage external to the processing unit.

A bit of the physical address is used as a control of the physical memory that receives or provides the data associated with an ANN. A bit of the physical address can be used as a selector of a type of a multiplexer. An input or an output of the multiplexer may include a bit of the data associated with an ANN.

According to another example embodiment, a method for caching data in artificial neural network (ANN) computations is provided. The method may include receiving, by a communication unit, data and a logical address of the data. The data can be associated with the ANN. The method may determine, by a processing unit coupled to the communication unit and to a plurality of physical memories and based on the logical address and physical parameters of the physical memories, a physical address of a physical memory of the plurality of physical memories. The method may then perform, by the processing unit, an operation associated with the data and the physical address.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are directed to methods and systems for caching data in ANN computations. Embodiments of the present disclosure may facilitate storing input values, weights, and other data associated with ANN computations in a plurality of memories of different type, sizes, access speeds, read speeds, write speeds, latencies, and other characteristics. The data can be assigned priorities based on their frequency of use and times for reuse in ANN computations after being written to the memories. Frequently used data can be assigned higher priority. The higher priority data can be stored in a faster memory and lower priority data can be stored in a slower memory.

While some embodiments of the present disclosure are described herein in reference to operations of FPGAs, the present technology may be also practiced with application-specific integrated circuits (ASICs), programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, FPGAs, application-specific integrated circuits (ASICs), programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, a module may also refer to a subpart of a computer system, a hardware device, an integrated circuit, or a computer program.

Technical effects of certain embodiments of the present disclosure can include enhancing memory allocation in integrated circuits, FPGAs, or computer systems configured to perform ANN computations. Further technical effects of certain embodiments of the present disclosure can allow increasing speeds for writing data and speeds for reading the data in the ANN computations, thereby accelerating the ANN computations.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1:
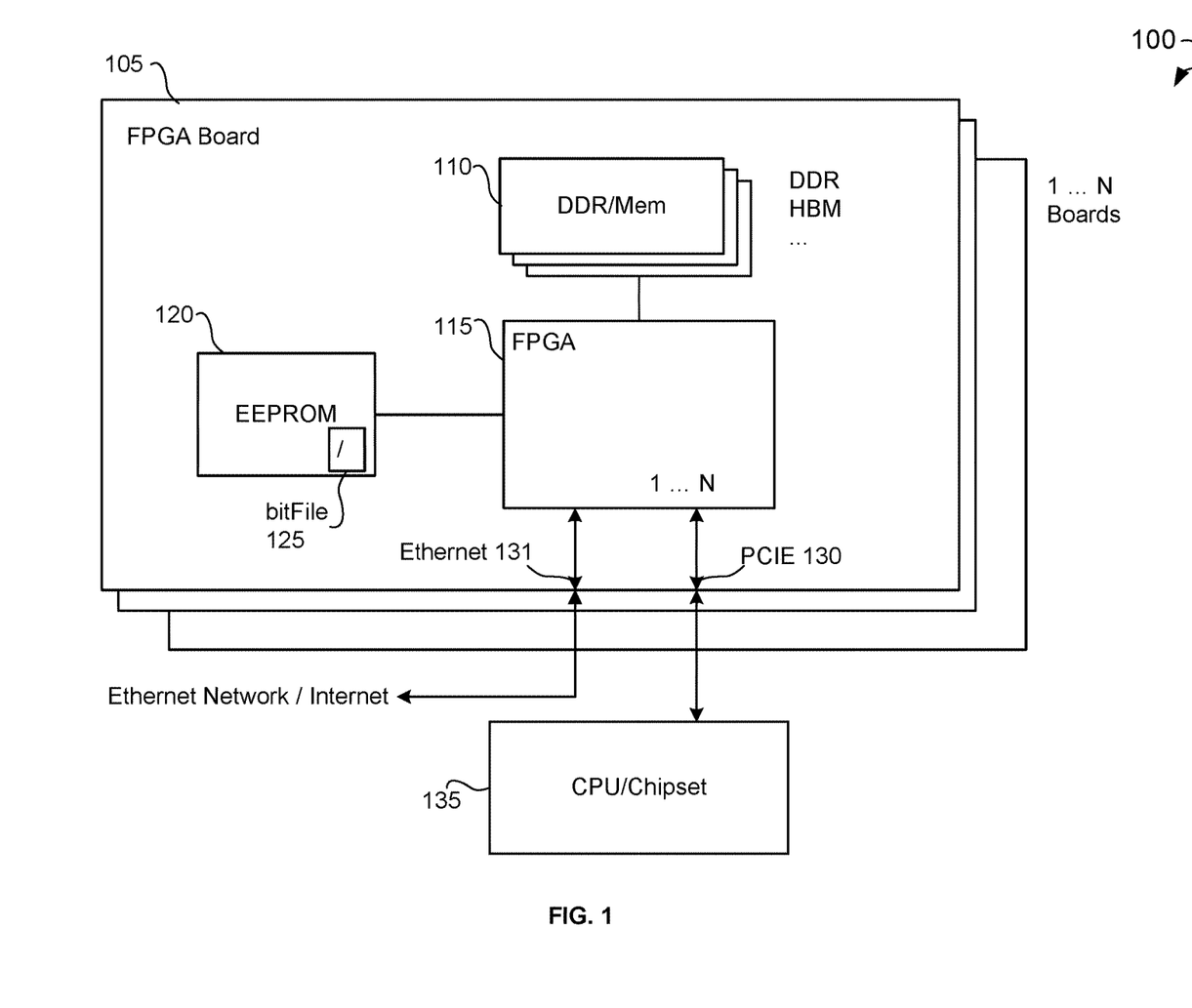
FIG. 1 is a block diagram showing an example system for caching data in ANN computations, according to some example embodiments.

FIG. 1 is a block diagram showing an example system 100 for caching data in ANN computations, according to some example embodiments. The system 100 can be part of a computing system, such as a personal computer, a server, a cloud-based computing recourse, and the like. The system 100 may include one or more FPGA boards 105 and a chipset 135 including at least one CPU. The chipset 135 can be communicatively connected to the FPGA boards 105 via a communication interface. The communication interface may include a Peripheral Component Interconnect Express (PCIE) standard 130. The communication interface may also include an Ethernet connection 131.

The FPGA board 105 may include an FPGA 115, a volatile memory 110, and a non-volatile memory 120. The volatile memory 110 may include a double data rate synchronous dynamic random-access memory (DDR SDRAM), High Bandwidth Memory (HBM), High Bandwidth Cache (HBC), graphics DDR SDRAM, or any other type of memory. The volatile memory 110 may include the host memory. The non-volatile memory 120 may include Electrically Erasable Programmable Read-Only Memory (EEROM), a solid-state drive (SSD), a flash memory, and so forth.

The FPGA 115 can include blocks. The blocks may include a set of elementary nodes (also referred to as gates) performing basic hardware operations, such as Boolean operations. The blocks may further include registers retaining bit information, one or more memory storage of different sizes, and one or more digital signal processors (DSPs) to perform arithmetic computations, for example, additions and multiplications. Programming FPGA 115 may include configuring each of the blocks to have an expected behavior and connecting the blocks by routing information between the blocks. Programming FPGA 115 can be carried out using a result from a compiler taken as an input schematic description, gate-level description, hardware languages like Verilog, System Verilog, or Very High Speed Integrated Circuit Hardware Description Language (VHDL), or any combination of thereof.

The non-volatile memory 120 can be configured to store instructions in a form of bit file 125 to be executed by the FPGA 115. The FPGA 115 can be configured by the instructions to perform one or more floating point operations including multiplication and addition to calculate a sum of products that can be used in neural network computations.

The volatile memory 110 can be configured to store weights W[i] for neurons of one or more ANNs, input values V[i] to be processed for the ANNs, and results of ANNs computation including any intermediate results of computations of layers of the ANNs.

Figure 2:
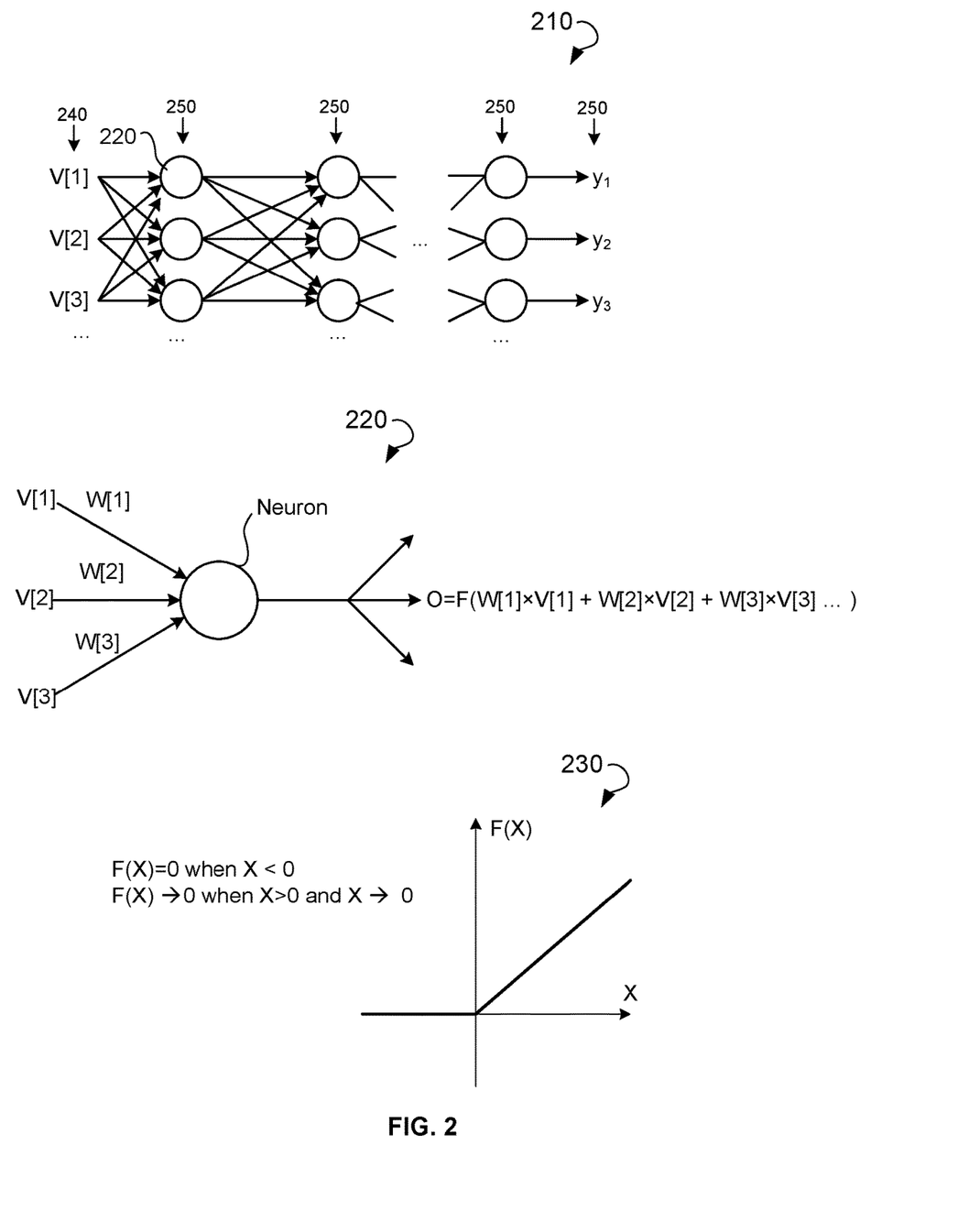
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers, hidden layers, and output layers may include one or more (artificial) neurons 220. The number of neurons can be different for different layers.

Each of neurons 220 may be represented by a calculation of a mathematical function $$O = F\left(\sum_{i=1}^{n} V[i] \times W[i]\right) \qquad (1)$$

wherein V[i] are neuron input values, W[i] are weights assigned to input values at the neuron, and F(X) is a transfer function. Typically, the transfer function 230 F(X) is selected to be zero for X<0 and have a limit of zero as X approaches zero. For example, the transfer function F(X) can be in the form of a sigmoid. The result of the calculation of a neuron propagates as an input value of further neurons in the ANN. The further neurons can belong to either the next layer, previous layer or the same layer.

It should be noted that while the ANN 210 illustrated in FIG. 2 can be referred to as a feedforward neural network, embodiments of the present disclosure can be also used in computations of convolution neural networks, recurrent neural networks, long short-term memory networks, and other types of ANNs.

Figure 3:
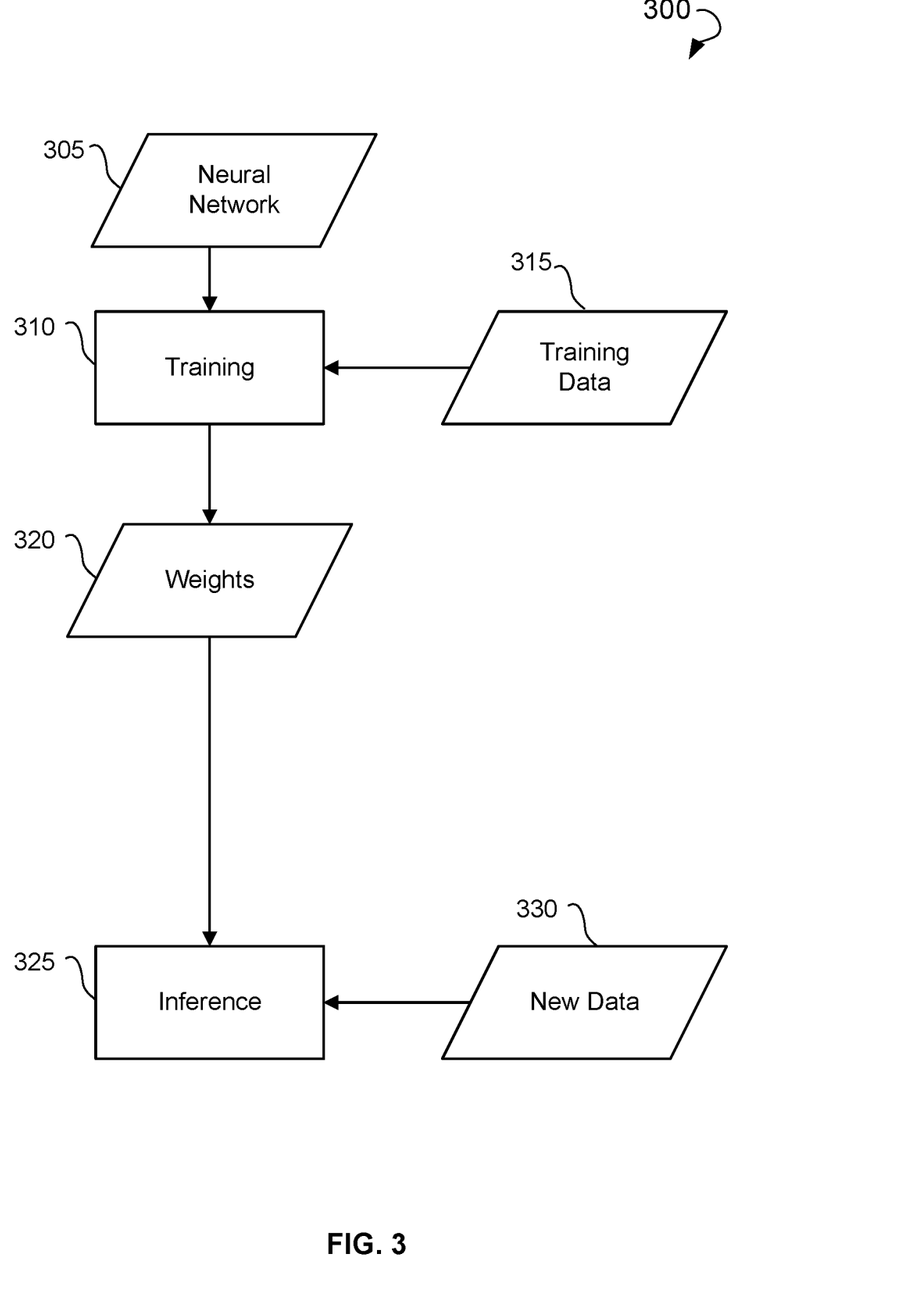
FIG. 3 is a flow chart showing training and inference of an ANN, according to some example embodiments.

FIG. 3 is a flow chart showing training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each sample may be represented as a pair of input values and expected output. The training data 315 may include hundreds to millions of samples. While training 310 is required to be performed only once, it may require a significant amount of computations and take a considerable time.

The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output which answer the problem that the ANN is supposed to solve. For example, an ANN can be trained to recognize various animals in images. Correspondingly, the ANN can be trained using millions of images of animals. Submitting a new image to the ANN would provide the information for animals in the new image (this process being known as image tagging). While the inference for each image takes fewer computations than training, number of inferences can be large because new images can be received from billions of sources.

The inference 325 includes multiple computations of sum of the following products:

$$\sum_{i=1}^{n} V[i] \times W[i] \qquad (2)$$

wherein the V[i] are new input values and W[i] are weights associated with neurons of the ANN.

Figure 4:
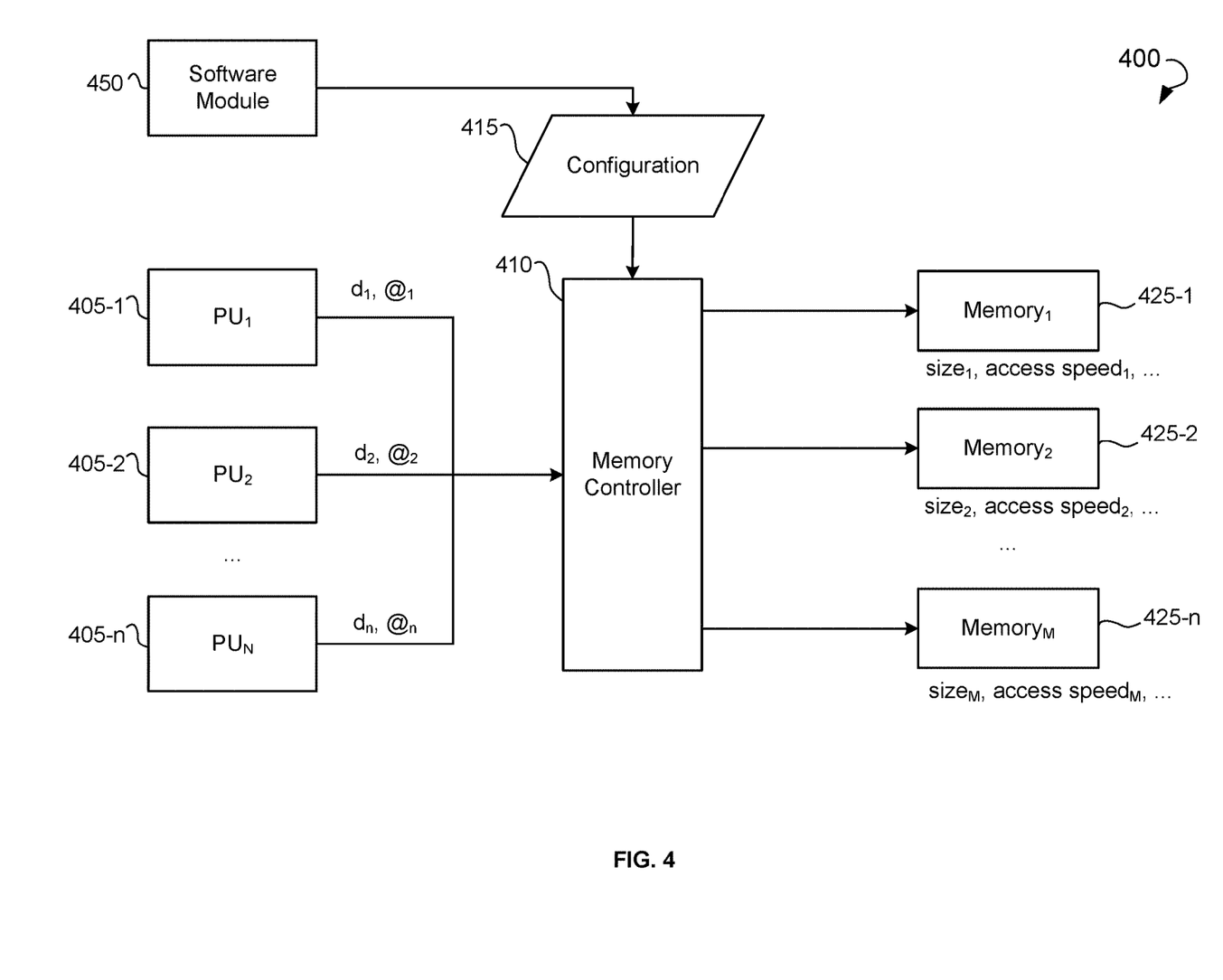
FIG. 4 is a block diagram showing a system for caching data in ANN computations, according to an example embodiment.

FIG. 4 is a block diagram showing a system 400 for caching data in ANN computations, according to some example embodiments. The system 400 may include one or more processing units 405-$i$ (i=1, . . . , N), one or more memory controller 410, and a plurality of memories 425-$i$ (i=1, . . . , M). The memories 425-$i$ (i=1, . . . , M) may include, but not limited to flash memory, solid state drive, hard disk drive, HBM, DDR, HBC, and Graphics DDR SDRAM. The memories may include different sizes, access speeds, write speeds, read speeds, and latencies. Typically, in computing systems, memories with higher access speeds have smaller sizes and memories with slower access speed have larger sizes. The memories with higher access speeds and of smaller sizes can be tightly integrated with the memory controller 410 on the same integrated circuit. Larger size memories with lower access speeds (or larger latencies) can be located externally on an integrated circuit where the memory controller is located. Each of the memories can be associated with one or more physical addresses.

The processing units 405-$i$ (i=1, . . . , N) may be configured to provide data $d_1, d_2, \ldots, d_n, \ldots$ related to an ANN to the memory controller 410. The data $d_1, d_2, \ldots, d_n, \ldots$ may include, for example, input values for neurons of one or more layers of the ANN, output values of neurons of one or more layers of the ANN, and weights assigned to input values at the neurons.

The data $d_1, d_2, \ldots, d_n, \ldots$ may be associated with the logical addresses $@_1, @_2, \ldots, @_n, \ldots$. The logical address $@_1, @_2, \ldots, @_n, \ldots$ may be indicative of a neuron, layer, type of data (for example, input values, output values, weights, and so on). In one example embodiment, the memory controller 410 may determine, based on a logical address of data, priority of the data. The memory controller 410 may further select, based on the priority, a memory from the plurality of memories and a physical address associated with the memory. The memory controller 410 may further perform an operation involving the data and the physical address. For example, the memory controller may write the data to the physical address of the selected memory. The memory controller 410 can be configured using a configuration 415. The configuration 415 may include information concerning sizes and access speeds of memories 425-$i$ (i=1, . . . , M). The configuration 415 may further include information concerning priorities of the memories 425-$i$ (i=1, . . . , M). The priorities of the memories can be based on sizes and access speeds of the memories. For example, a priority of a memory can be determined based on a time lapse between a time the data is written to the memory and a time the data is used in the ANN computation. The configuration 415 may also include rules for mapping the logical addresses $@_1, @_2, \ldots, @_n, \ldots$ to priorities for selecting memories.

In another example embodiment, the memory controller 410 can be configured to select memory from the plurality of memories 425-$i$ (i=1, . . . , M) based on a logical address associated with the data. The configuration 415 may include rules for mapping logical addresses $@_1, @_2, \ldots @_n, \ldots$ to the memories 425-$i$ (i=1, . . . , M).

The configuration 415 can be determined based on the structure of an ANN by a software module 450. The software module 450 can be configured to assign a logical address to weights, input values, and outputs values of each layer in the ANN.

Figure 5:
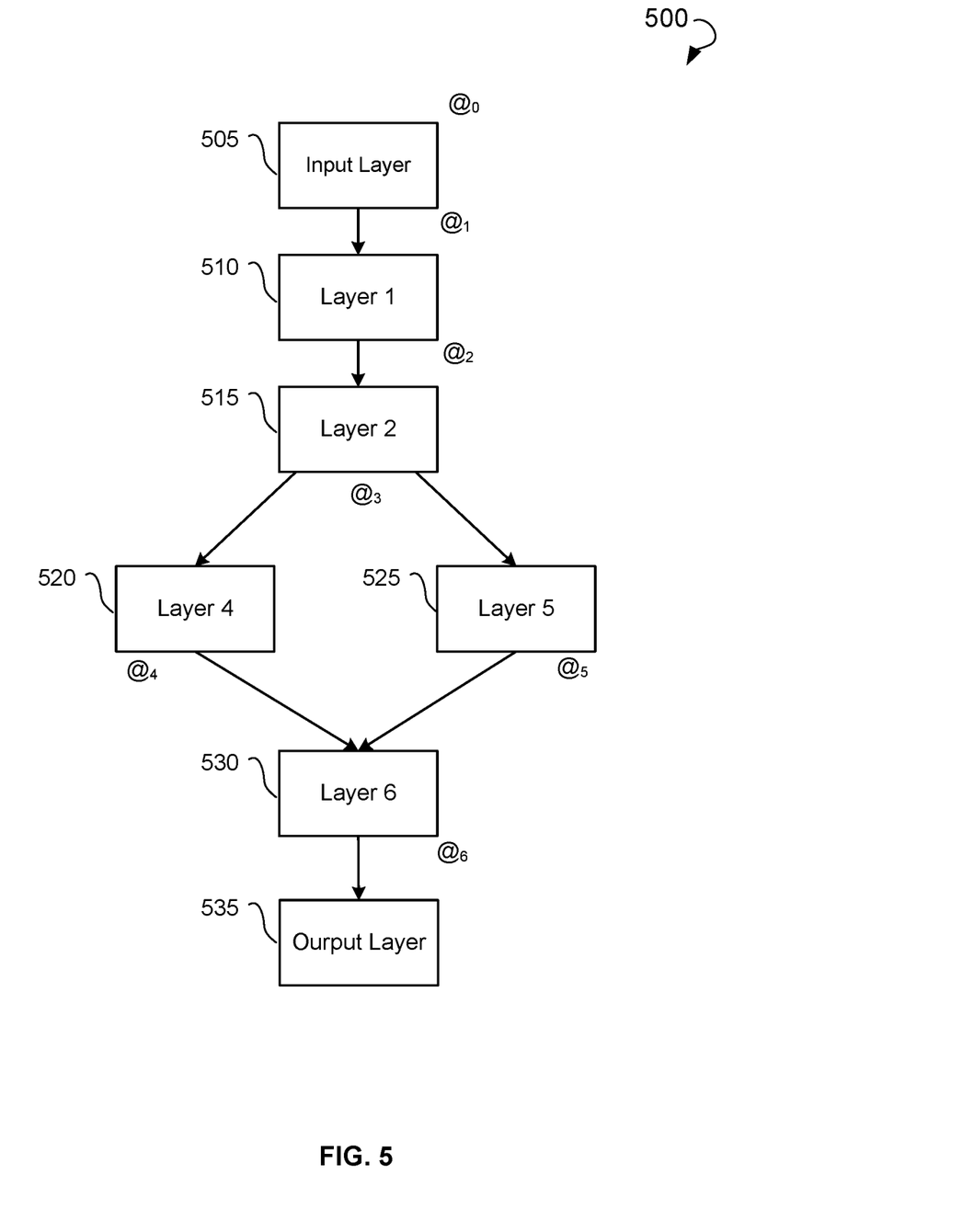
FIG. 5 is a block diagram showing an ANN, according to example embodiment.

FIG. 5 shows an example ANN 500. The ANN 500 includes an input layer 505, hidden layers 510, 515, 520, 525, 530, and output layer 535. In example of FIG. 5, input values for input layer 505 can be assigned to logical addresses $@_0$. Output values of input layer 505 can be assigned to the logical addresses $@_1$. The output values of the input layer 505 are input values for hidden layer 510. Therefore, logical addresses $@_1$ can be also used for the input values of the hidden layer 510. Similarly, output values of layers 515, 520, 525, and 530 can be assigned to logical address $@_3$, $@_4$, $@_5$, and $@_6$ respectively. The logical addresses $@_3$ can be also used for input values for layers 520 and 530. The logical addresses $@_4$ and $@_5$ can be also used for input values of layer 530. The logical addresses $@_6$ can be used for input values of output layer 535.

The software module 450 may determine priorities for data di associated with logical addresses $@_i$ (i=0, 1, . . . , n, . . . ) using the following parameters:

1) a bandwidth of a layer for which the data $d_i$ used as input values. The bandwidth can be determined as amount of data that can be processed by layer per a time period.

2) a list of data previously written to the memories 425-$i$ (i=1, . . . , M) and kept in memories. In example of FIG. 5, output values associated with logical address $@_3$ should be kept in memory until both layer 520 and layer 525 are processed.

3) available sizes of the memories 425-$i$ (i=1, . . . , M).

The software module 450 can analyze data flow in an ANN to determine lapses between times at which data are written to the memories 425-$i$ (i=1, . . . , M) and times at which data are reused in ANN computations.

Figure 6:
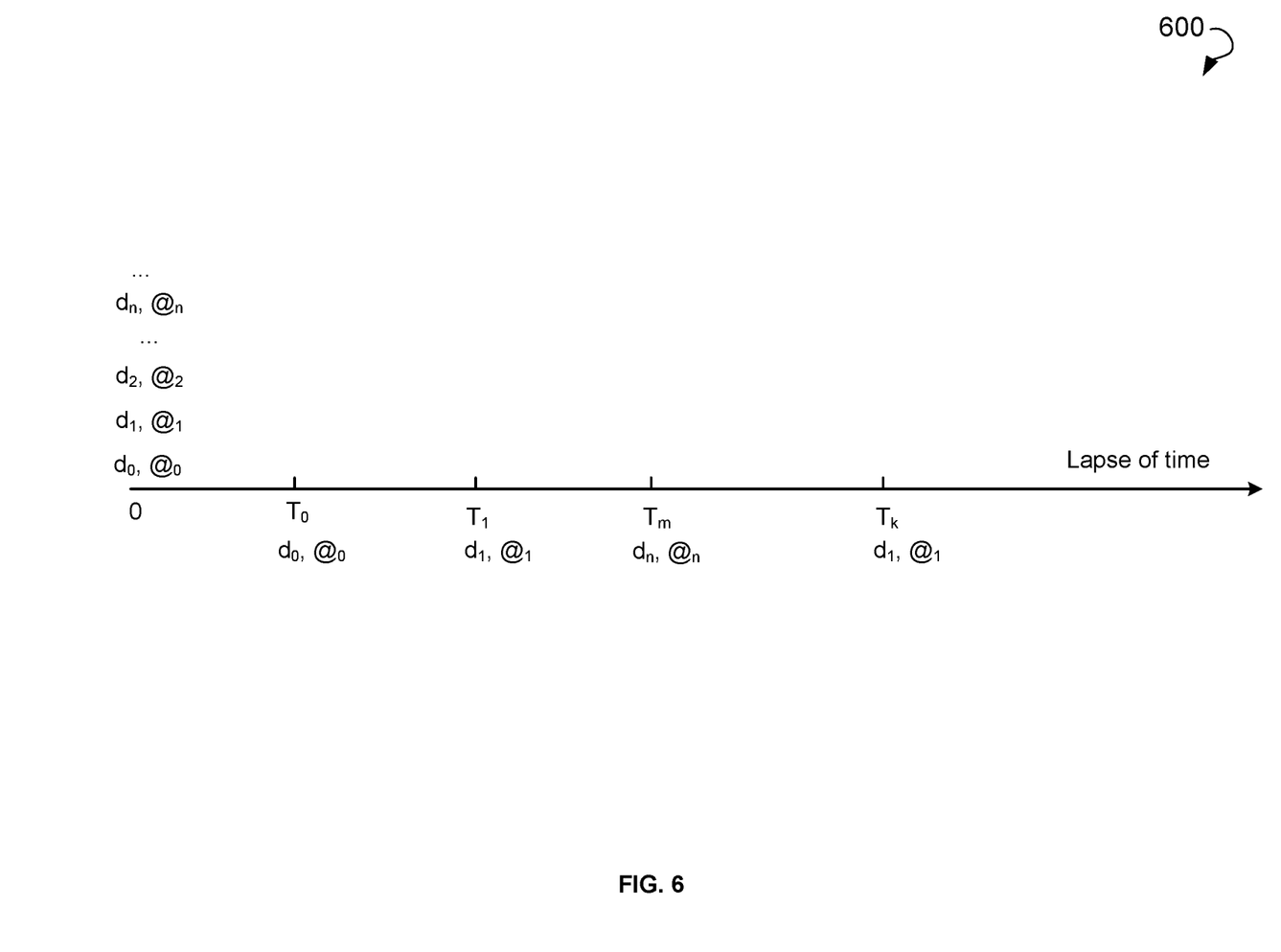
FIG. 6 is a plot showing times for reusing data in ANN computations, according to an example embodiment.

FIG. 6 is plot 600 showing lapse times for acquiring data timed in ANN calculations, according to an example embodiment. In the example of FIG. 6, the data do with logical address $@_0$ are read at time $T_0$ after being written to the memories. The data do with logical address $@_n$ are reused at time $T_m$ after being written to the memories. The data di with logical address $@_1$ are reused at least twice at times $T_1$ and $T_k$ after being written to the memories.

After estimating the lapses of time of reuse of data, the software module 450 may assign a higher priority to the data to be reused in short lapses of time. The data can be assigned a lower priority if the data are reused in a long lapse of time. The software module 450 can assign higher priority to frequently used data. Data that have been used once only or rarely used data can be assigned a lower priority.

In some embodiments, if the data cannot be written to a single memory due to a larger size of the data, the memory controller 410 can be configured to write the data to at least two memories of the plurality of memories. The two memories may differ in access speeds.

Figure 7:
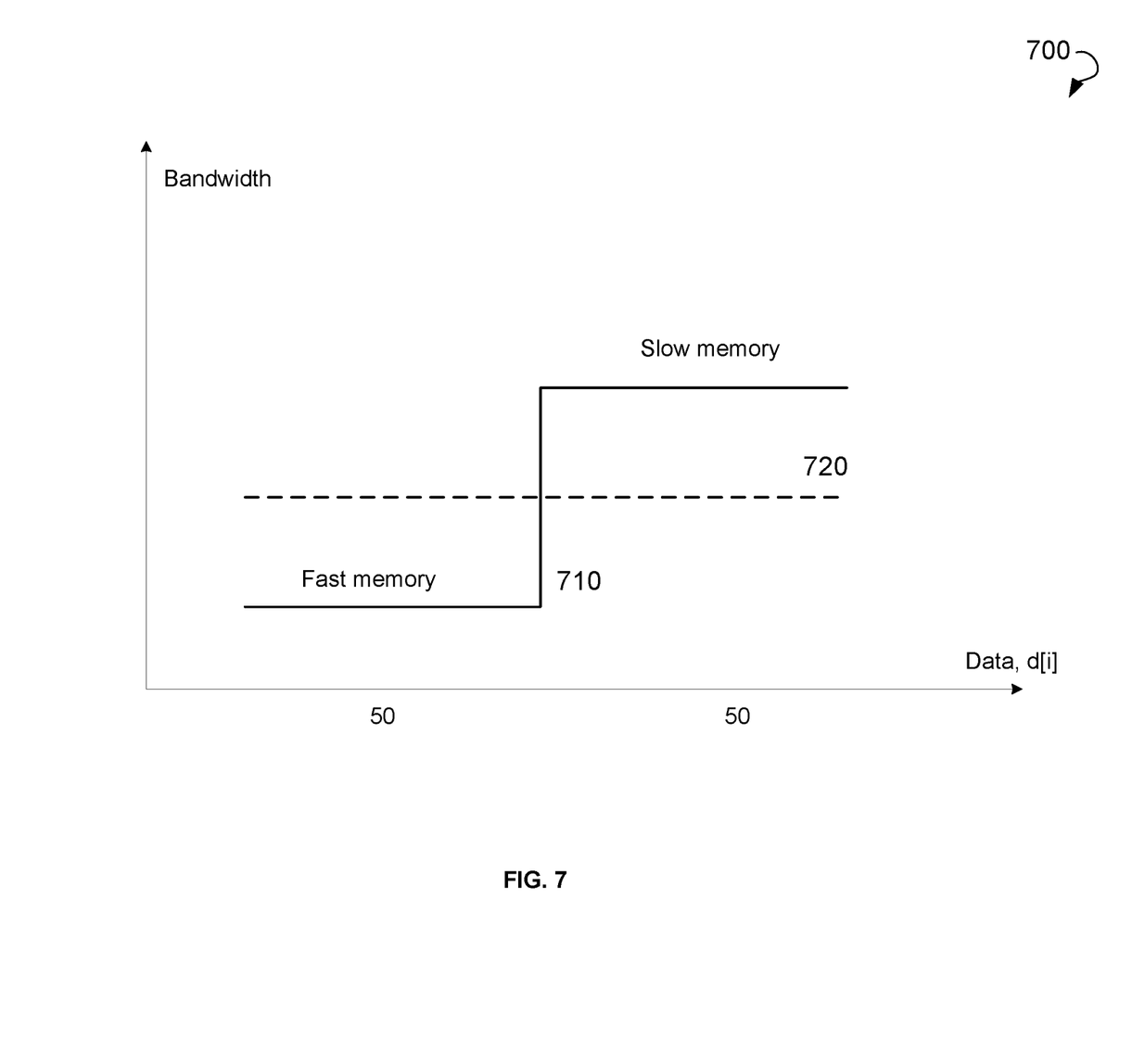
FIG. 7 is a plot showing bandwidth of writing data to two memories with different access speeds, according to an example embodiment.

FIG. 7 is a plot showing bandwidths 710 and 720 of writing data d[i] (i=1, . . . , N) to a faster memory and a slower memory, according to an example embodiment. Bandwidth 710 corresponds to the case where the first part of the data (d[i], i=1, . . . , N/2) is completely written to the faster memory and the second part of data (d[i], i=N/2+1, . . . , N) is completely written to the slower memory. Therefore bandwidth 710 may include a step at point 50%. To smooth the bandwidth of writing data (and bandwidth of reading data from the memories), the memory controller 410 can be configured to write a value d[i] of data to the faster memory and a subsequent value d[i+1] to the slower memory, wherein i=0, 2, 4, . . . N−2. In FIG. 7, the smoothed bandwidth is shown as bandwidth 720.

Figure 8:
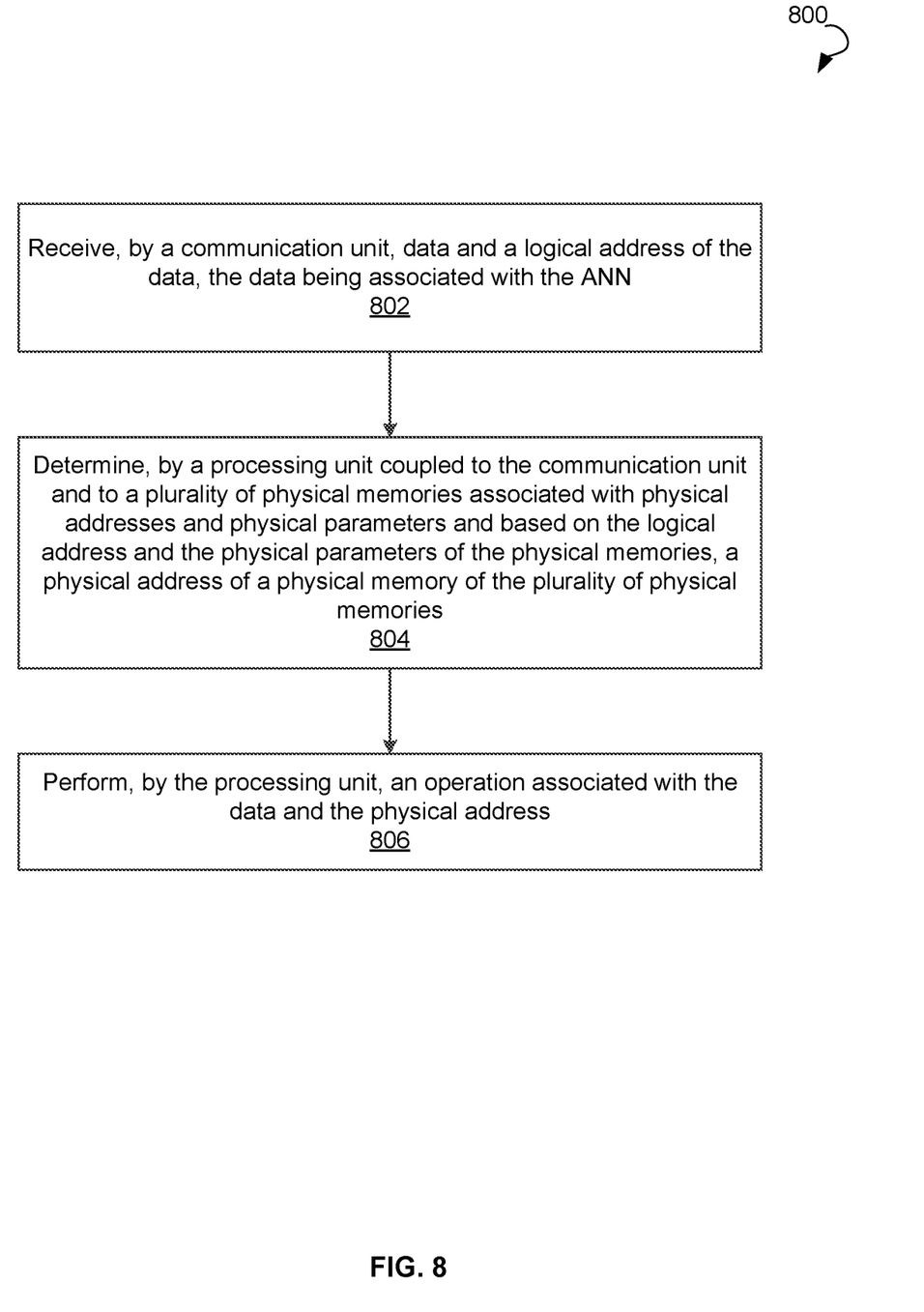
FIG. 8 is a flow chart showing steps of a method for caching data in ANN computations, according to some example embodiments.

FIG. 8 is a flow chart illustrating a method 800 for caching data in ANN computations, in accordance with some example embodiments. In some embodiments, the operations may be combined, performed in parallel, or performed in a different order. The method 800 may also include additional or fewer operations than those illustrated. The method 800 may be performed by system 400 described above with reference to in FIG. 4.

The method 800 may commence in block 802 with receiving, by a communication unit, data and a logical address of the data, the data being associated with the ANN. The logical address of the data can be indicative of an input of one or more layers of the ANN or a weight of the one or more layers of the ANN.

In block 804, the method 800 may determine, by a processing unit coupled to the communication unit and to a plurality of physical memories and based on the logical address and physical parameters of the physical memories, a physical address of a physical memory of the plurality of physical memories. The plurality of physical memories may include at least two physical memories associated with different physical parameters. The different physical parameters may include different access speeds, different sizes, or different latencies for writing to or reading the data from the physical memories. The determination of the physical address of the physical memory can be based on a usage count of the data in the ANN computation.

The physical memories can be associated with priorities. The priorities can be based on physical parameters associated with the physical memories. A priority of a physical memory of the plurality of physical memories can be determined based on a time lapse between a time the data is written to the physical memory and a time the data is used in the ANN computation. Determining the physical address of the physical memory can include selecting, based on an order of the priorities, the physical memory of the plurality of physical memories.

In block 806, the method 800 may proceed with performing, by the processing unit, an operation associated with the data and the physical address. The operation may include a write to the physical memory at the physical address.

Figure 9:
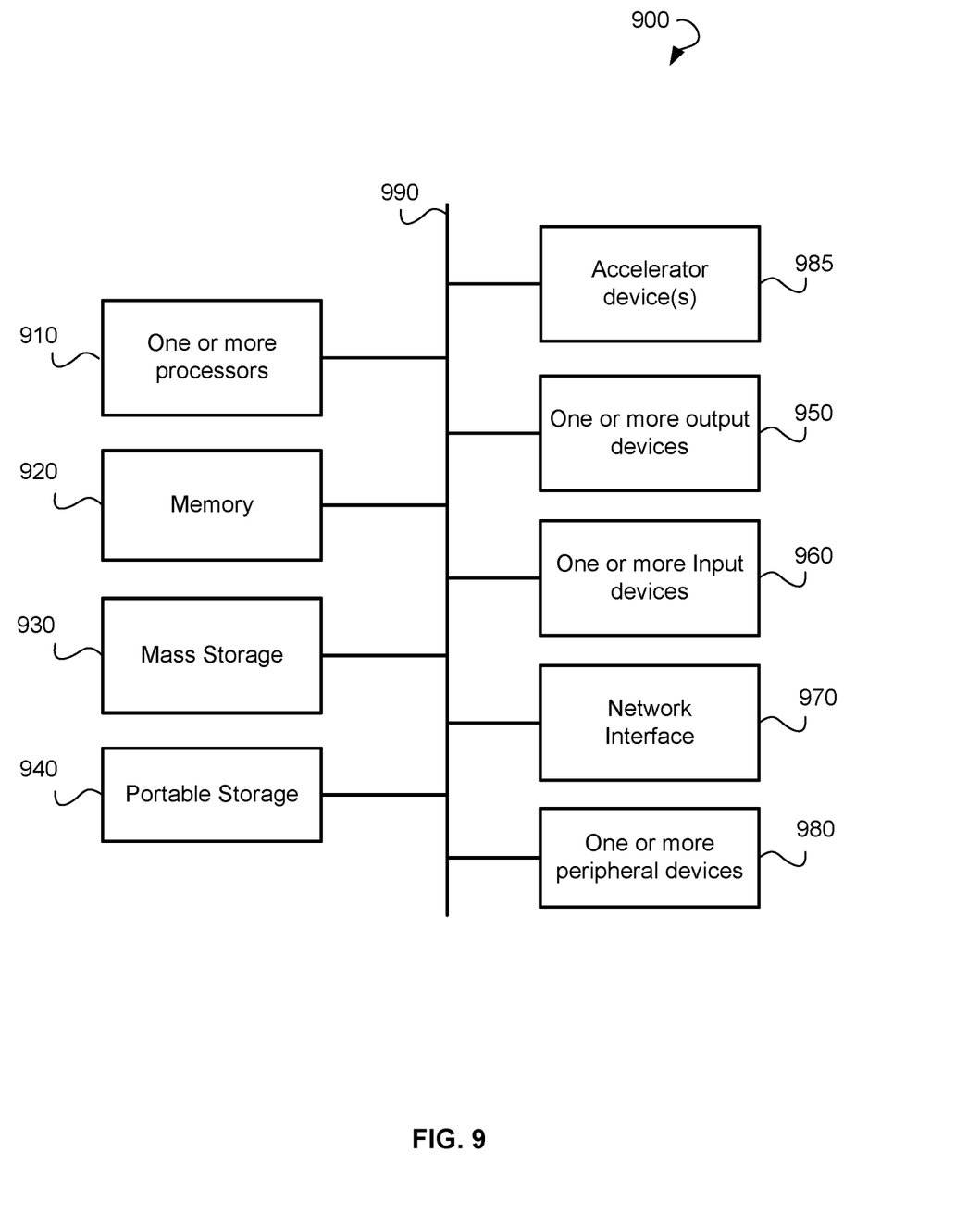
FIG. 9 shows a computing system that can be used to implement embodiments of the disclosed technology.

FIG. 9 illustrates an example computing system 900 that may be used to implement embodiments described herein. The example computing system 900 of FIG. 9 may include one or more processors 910 and memory 920. Memory 920 may store, in part, instructions and data for execution by the one or more processors 910. Memory 920 can store the executable code when the exemplary computing system 900 is in operation. The processor 910 may include internal accelerators like a graphical processing unit, a Field Programmable Gate Array, or similar accelerators that may be suitable for use with embodiments described herein. The memory 920 may include internal accelerators like a graphical processing unit, a Field Programmable Gate Array, or similar accelerators that may be suitable for use with embodiments described herein. The example computing system 900 of FIG. 9 may further include a mass storage 930, portable storage 940, one or more output devices 950, one or more input devices 960, a network interface 970, and one or more peripheral devices 980.

The components shown in FIG. 9 are depicted as being connected via a single bus 990. The components may be connected through one or more data transport means. The one or more processors 910 and memory 920 may be connected via a local microprocessor bus, and the mass storage 930, one or more peripheral devices 980, portable storage 940, and network interface 970 may be connected via one or more input/output buses.

Mass storage 930, which may be implemented with a magnetic disk drive, an optical disk drive or a solid state drive, is a non-volatile storage device for storing data and instructions for use by a magnetic disk, an optical disk drive or SSD, which in turn may be used by one or more processors 910. Mass storage 930 can store the system software for implementing embodiments described herein for purposes of loading that software into memory 920. The mass storage 930 may also include internal accelerators like a graphical processing unit, a Field Programmable Gate Array, or similar accelerators that may be suitable for use with embodiments described herein.

Portable storage 940 may operate in conjunction with a portable non-volatile storage medium, such as a compact disk (CD) or digital video disc (DVD), to input and output data and code to and from the computing system 900 of FIG. 9. The system software for implementing embodiments described herein may be stored on such a portable medium and input to the computing system 900 via the portable storage 940.

One or more input devices 960 provide a portion of a user interface. The one or more input devices 960 may include an alphanumeric keypad, such as a keyboard, for inputting alphanumeric and other information, or a pointing device, such as a mouse, a trackball, a stylus, or cursor direction keys. Additionally, the computing system 900 as shown in FIG. 9 includes one or more output devices 950. Suitable one or more output devices 950 include speakers, printers, network interfaces, and monitors.

Network interface 970 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 970 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 980 may include any type of computer support device to add additional functionality to the computing system. The one or more peripheral devices 980 may include a modem or a router.

The example computing system 900 of FIG. 9 may also include one or more accelerator devices 985. The accelerator devices 985 may include PCIe-form-factor boards or storage-form-factor boards, or any electronic board equipped with a specific electronic component like a Graphical Processing Unit, a Neural Processing Unit, a Multi-CPU component, a Field Programmable Gate Array component, or similar accelerators electronic or photonic components, that may be suitable for use with embodiments described herein.

The components contained in the exemplary computing system 900 of FIG. 9 are those typically found in computing systems that may be suitable for use with embodiments described herein and are intended to represent a broad category of such computer components that are well known in the art. Thus, the exemplary computing system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for caching data in ANN computations have been described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for caching data in artificial neural network (ANN) computations, the system comprising:
a module configured to:
estimate, based on a structure of the ANN to be computed, times of reuse of the data in the computation of the ANN, wherein the data are associated with a logical address and include values associated with neurons of the ANN, wherein the estimation of the times of reuse of data is based on a number of the neurons using the data and a location of the neurons using the data in the structure of the ANN; and
assign, based on the times of reuse of the data, a priority to the logical address;
a plurality of physical memories, the physical memories being associated with physical addresses and physical parameters; and
memory controller coupled to the plurality of physical memories, wherein the memory controller is configured to:
receive the data and the logical address of the data and the priority of the logical address;
determine, based on the priority of the logical address and the physical parameters, a physical address of a physical memory of the plurality of physical memories, the data to be stored solely in the physical memory; and
perform an operation associated with the data and the physical address.

2. The system of claim 1, wherein the plurality of physical memories includes at least two physical memories associated with different physical parameters, the different physical parameters including one of: different access speeds, different sizes, or different latencies for the operation.

3. The system of claim 1, wherein the operation includes a write to the physical memory at the physical address.

4. The system of claim 1, wherein the logical address of the data is indicative of an input of one or more layers of the ANN or a weight of the one or more layers of the ANN.

5. The system of claim 1, wherein the determination of the physical address of the physical memory is based on a usage count of the data in the ANN computation.

6. The system of claim 1, wherein:
the physical memories are associated with priorities, the priorities being based on physical parameters associated with the physical memories; and
the memory controller is configured to select, based on an order of the priorities, the physical memory from the plurality of physical memories, the physical memory being selected to perform the operation.

7. The system of claim 6, wherein a priority of the physical memory of the plurality of physical memories is determined based on a time lapse between a time the data is written to the physical memory and a time the data is used in the ANN computation.

8. The system of claim 6, wherein the data include a sequence of inputs and the memory controller is configured to:
determine that a size of the data exceeds a size of the selected physical memory; and
in response to the determination:
select a further physical memory from the plurality of memories, the further physical memory being associated with a further priority, the further priority being lower than a priority of the selected physical memory; and write the inputs from the sequence to the selected physical memory and to the further physical memory.

9. The system of claim 6, wherein the memory controller is configured to receive a configuration for determining the physical address, the configuration including information related to mapping the data associated with one or more layers of the ANN to the priorities.

10. The system of claim 1, wherein the memory controller resides in one of: a field-programmable gate array or an application-specific integrated circuit.

11. The system of claim 10, wherein the plurality of physical memories includes a memory integrated with the memory controller.

12. The system of claim 10, wherein the plurality of physical memories includes a memory storage external to the memory controller.

13. The system of claim 10, wherein a bit of the physical address is used as a control of the physical memory, the physical memory receiving or providing the data associated with an ANN.

14. The system of claim 10, wherein a bit of the physical address is used as a selector of a type of a multiplexer, wherein an input or an output of the multiplexer includes a bit of the data associated with an ANN.

15. A method for caching data in artificial neural network (ANN) computations, the method comprising:
estimating, by a module and based on a structure of the ANN to be computed, times of reuse of the data in the computation of the ANN, wherein the data are associated with a logical address and include values associated with neurons of the ANN, wherein the estimation of the times of reuse of data is based on a number of the neurons using the data and a location of the neurons using the data in the structure of the ANN; and
assigning, by the module and based on the times of reuse of the data, a priority to the logical address;
receiving, by a memory controller coupled to a plurality of physical memories and based on the logical address and physical parameters of the physical memories, the data and the logical address of the data and the priority of the logical address;
determining, by a memory controller and based on the priority of the logical address, a physical address of a physical memory of the plurality of physical memories, the data to be stored solely in the physical memory; and
performing, by the memory controller, an operation associated with the data and the physical address.

16. The method of claim 15, wherein the operation includes a write to the physical memory at the physical address.

17. The method of claim 15, wherein:
the plurality of physical memories includes at least two physical memories associated with different physical parameters, the different physical parameters including one of: different access speeds, different sizes, or different latencies for the operation; and
the logical address of the data is indicative of an input of one or more layers of the ANN or a weight of the one or more layers of the ANN.

18. The method of claim 15, wherein the determining the physical address of the physical memory is based on a usage count of the data in the ANN computation.

19. The method of claim 15, wherein:
the physical memories are associated with priorities, the priorities being based on physical parameters associated with the physical memories; and
the determining the physical address of the physical memory includes selecting, based on an order of the priorities, the physical memory from the plurality of physical memories, wherein a priority of the physical memory of the plurality of physical memories is determined based on a time lapse between a time the data is written to the physical memory and a time the data is used in the ANN computation.

20. A system for caching data in artificial neural network (ANN) computations, the system comprising:
a plurality of physical memories, the physical memories being associated with physical addresses and physical parameters, wherein the plurality of physical memories includes at least two physical memories associated with different physical parameters, the different physical parameters including one of: different access speeds, different sizes, or different latencies for the operation;
a module configured to:
estimate, based on a structure of the ANN to be computed, times of reuse of the data in the computation of the ANN, wherein the data are associated with a logical address and include values associated with neurons of the ANN, wherein the estimation of the times of reuse of data is based on a number of the neurons using the data and a location of the neurons using the data in the structure of the ANN; and
assign, based on the times of reuse of the data, a priority to the logical address;
and
a memory controller coupled to the plurality of physical memories, wherein the memory controller is configured to:
receive the data and the logical address of the data and the priority of the logical address;
determine, based on the priority of the logical address and the physical parameters, a physical address of a physical memory of the plurality of physical memories, the data to be stored solely in the physical memory; and
perform an operation associated with the data and the physical address.

* * * * *